United States Patent
Rao et al.

(10) Patent No.: US 12,175,080 B2
(45) Date of Patent: Dec. 24, 2024

(54) DYNAMIC METRO CONFIGURATION USING STORAGE AREA NETWORK (SAN) RESPONSE TIME HINTS FROM HOST COMPUTER

(71) Applicant: Dell Products L.P., Round Rock, TX (US)

(72) Inventors: Vinay G. Rao, Bangalore (IN); Vasudevan Subramanian, Chapel Hill, NC (US); Sanjib Mallick, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/108,775

(22) Filed: Feb. 13, 2023

(65) Prior Publication Data
US 2024/0272795 A1 Aug. 15, 2024

(51) Int. Cl.
G06F 3/06 (2006.01)

(52) U.S. Cl.
CPC ............ G06F 3/061 (2013.01); G06F 3/0655 (2013.01); G06F 3/067 (2013.01)

(58) Field of Classification Search
None
See application file for complete search history.

(56) References Cited

U.S. PATENT DOCUMENTS

| | | | |
|---|---|---|---|
| 7,688,753 B1 * | 3/2010 | Zimran | H04L 67/06 702/182 |
| 11,526,283 B1 | 12/2022 | Mallick et al. | |
| 2020/0106698 A1 * | 4/2020 | Rao | H04L 45/70 |
| 2021/0034270 A1 | 2/2021 | Gupta et al. | |
| 2021/0044509 A1 * | 2/2021 | Brown | H04L 43/08 |
| 2021/0390066 A1 * | 12/2021 | Haywood | G06F 12/023 |
| 2022/0129173 A1 | 4/2022 | Martin et al. | |
| 2022/0342548 A1 | 10/2022 | Tylik et al. | |
| 2022/0405187 A1 | 12/2022 | Chen et al. | |

\* cited by examiner

Primary Examiner — Arpan P. Savla
Assistant Examiner — Edmund H Kwong
(74) Attorney, Agent, or Firm — BainwoodHuang (57) ABSTRACT

Techniques for dynamically configuring a multi-site storage system such as a metro cluster using input/output (IO) response time (RT) hints from a host computer. The techniques include receiving IO RT hints at each storage appliance of the multi-site storage system from the host computer, which is initially identified as "local" or "remote" relative to a physical location of the storage appliance. The techniques further include modifying, by the storage appliance, an initial local or remote identification of the host computer relative to the physical location of the storage appliance based on the received IO RT hints, dynamically changing, by the storage appliance, states of IO paths between the host computer and nodes of the storage appliance based on the modified local or remote identification of the host computer, and providing, by the storage appliance, notification of the changed states of the IO paths to the host computer.

20 Claims, 3 Drawing Sheets

DYNAMIC METRO CONFIGURATION USING STORAGE AREA NETWORK (SAN) RESPONSE TIME HINTS FROM HOST COMPUTER

BACKGROUND

Multi-site storage systems can be deployed in public and private cloud computing configurations. The multi-site storage systems include storage processing circuitry and arrays of storage devices or drives such as solid-state drives (SSDs), hard disk drives (HDDs), optical drives, and so on. The storage processing circuitry service storage input/output (IO) requests generated by client (or "host") computers. The storage IO requests (e.g., read IO requests, write IO requests) specify data blocks, data files, data pages, or other suitable data elements to be read from or written to volumes, virtual volumes, logical units, volume (VOL) or logical unit (LUN) groups, filesystems, or other suitable storage objects maintained on the storage devices or drives. One such multi-site storage system is referred to herein as a "metro cluster," which includes several storage appliances deployed in different physical locations such as different data centers. The storage appliances include storage arrays for hosting storage objects and multiple storage nodes (or simply "nodes") for high availability. In a metro cluster configuration, two storage objects (e.g., volumes) maintained by two storage appliances, respectively, can be perceived by a host computer as a single storage object, which is referred to herein as a "metro volume."

SUMMARY

In a metro cluster configuration where a host computer is not equidistant from two storage appliances, a system administrator can manually configure or provision a metro volume to the host computer and initially designate or identify the host computer as "local" relative to a first storage appliance (the "local storage appliance") and "remote" relative to a second storage appliance (the "remote storage appliance"). For example, individual nodes of the storage appliances may each include a system management application having a user interface (e.g., Graphical User Interface (GUI), REpresentational State Transfer (REST) interface) through which the system administrator can provision the metro volume and make the local and remote identifications of the host computer. Having made initial local and remote identifications of the host computer, the system administrator can define or set, via the user interface, states of IO paths between the host computer and nodes of the local and remote storage appliances. For example, the system administrator may use the Asymmetric Logical Unit Access (ALUA) features of the Small Computer System Interface (SCSI) to set (i) a state of a first IO path between the host computer and a first node of the local storage appliance as ALUA optimized, (ii) a state of a second IO path between the host computer and a second node of the local storage appliance as ALUA non-optimized, (iii) a state of a third IO path between the host computer and a first node of the remote storage appliance as ALUA non-optimized, and (iv) a state of a fourth IO path between the host computer and a second node of the remote storage appliance as ALUA non-optimized. Once the states of the IO paths between the host computer and the nodes of the local and remote storage appliances are defined or set, a multipath IO (MPIO) driver implemented on the host computer can select an IO path over which to access data of the metro volume based on the states of the IO paths. For example, the MPIO driver may select the first IO path whose state is ALUA optimized to access the data of the metro volume through the first node of the local storage appliance.

Such an approach to identifying a host computer as local or remote relative to storage appliances in a metro cluster and setting states of IO paths can be problematic, however, because local and remote identifications of the host computer will remain static and unchanging until modified by a storage administrator. For example, the host computer and/or one of the storage appliances may be moved to different physical locations such as different data centers, causing initial local and remote identifications of the host computer to become invalid. Further, in a production storage environment, increased IO response times (RTs) for IO paths between the host computer and the local storage appliance due to storage area network (SAN) congestion, faulty SAN connectivity, and so on, may introduce additional network latency overhead to storage IO processing at the local storage appliance. If the additional network latency overhead at the local storage appliance exceeds a network latency overhead to the remote storage appliance, then it may be more appropriate for the MPIO driver on the host computer to select an IO path for a node of the remote storage appliance rather than the local storage appliance to access data of the metro volume. It may also be more appropriate for the MPIO driver to select an IO path for a node of the remote storage appliance during a nondisruptive upgrade (NDU) of the local storage appliance, which at that time may have just one working node. However, because the local and remote identifications of the host computer will remain static and unchanging until modified by the storage administrator, such more appropriate host selections of IO paths to nodes of storage appliances over which to access data of a metro volume may be more difficult and/or less efficient to make.

Techniques are disclosed herein for dynamically configuring a multi-site storage system such as a metro cluster using IO response time (RT) hints from a host computer. The disclosed techniques can allow appropriate host selections of IO paths to nodes of two (or more) storage appliances of the metro cluster to be made with greater ease and efficiency. The disclosed techniques can include, in response to a storage object such as a metro volume being configured or provisioned to the host computer, receiving, from the host computer at each storage appliance, IO RTs measured or obtained for IO paths between the host computer and nodes of the two storage appliances. Such IO RTs can be characterized as hints regarding a locational status or proximity of the host computer relative to the storage appliances.

The disclosed techniques can include, in response to receiving the IO RTs for the IO paths, performing, by each storage appliance, an initial identification of the host computer as "local" or "remote" relative to a physical location of the storage appliance. The disclosed techniques can further include, having made the initial identification of the host computer as "local" or "remote," defining or setting, by the storage appliance, states of the IO paths between the host computer and nodes of the storage appliance. The disclosed techniques can further include sending or providing, to the host computer by the storage appliance, a notification of the IO path states for the nodes of the storage appliance. Upon receipt of the IO path state notification, the MPIO driver on the host computer can select an IO path between the host computer and the nodes of the two storage appliances over which to access data of the metro volume based on the states of the IO paths.

The disclosed techniques can include receiving, at each storage appliance at periodic (e.g., hourly) intervals, additional IO RT hints for the IO paths between the host computer and the nodes of the two storage appliances. The disclosed techniques can further include, in response to receiving additional IO RT hints at a predetermined number of periodic (e.g., hourly) intervals, performing, by each storage appliance, a subsequent identification of the host computer as "local" or "remote" relative to a physical location of the storage appliance, and determining, by the storage appliance, that the initial identification of the host computer as "local" or "remote" is no longer valid. The disclosed techniques can further include dynamically redefining, resetting, or changing, by the storage appliance, the states of the IO paths between the host computer and the nodes of the storage appliance based on the subsequent identification of the host computer as "local" or "remote," and providing, by the storage appliance, a notification of the IO path state changes for the nodes of the storage appliance to the host computer.

By receiving input/output (IO) response time (RT) hints at each storage appliance of a multi-site storage system from a host computer initially identified as "local" or "remote" relative to a physical location of the storage appliance, modifying, by the storage appliance, an initial local or remote identification of the host computer relative to the physical location of the storage appliance based on the received IO RT hints, dynamically changing, by the storage appliance, states of IO paths between the host computer and nodes of the storage appliance based on the modified local or remote identification of the host computer, and providing, by the storage appliance, a notification of the changed states of the IO paths to the host computer, more appropriate host selections of IO paths over which to access data of a storage object within the multi-site storage system can be made with greater ease and efficiency.

In certain embodiments, a method includes receiving, at a first storage appliance from among two storage appliances of a multi-site storage system, input/output (IO) response time (RT) hints from a host computer, in which the host computer is initially identified as "local" or "remote" relative to a physical location of the first storage appliance, and the IO RT hints received at the first storage appliance indicate a locational status or proximity of the host computer relative to the first storage appliance. The method further includes modifying, by the first storage appliance, a first initial identification of the host computer as "local" or "remote" relative to the physical location of the first storage appliance based on the IO RT hints received at the first storage appliance, dynamically changing, by the first storage appliance, a state of a first IO path between the host computer and a first node of the first storage appliance based on the modified first initial identification of the host computer, and providing, to the host computer by the first storage appliance, a notification of the changed state of the first IO path between the host computer and the first node of the first storage appliance, in which selections of IO paths over which to access data of a storage object within the multi-site storage system are made by the host computer in response to the notification of the changed state of the first IO path.

In certain arrangements, the method includes receiving, at a second storage appliance from among the two storage appliances of the multi-site storage system, IO RT hints from the host computer, in which the IO RT hints received at the second storage appliance indicate a locational status or proximity of the host computer relative to the second storage appliance, and the host computer is not equidistant from the first storage appliance and the second storage appliance.

In certain arrangements, the host computer is initially situated at a location local to the first storage appliance and remote from the second storage appliance. The method further includes making the first initial identification of the host computer as "local" relative to the physical location of the first storage appliance, and making a second initial identification of the host computer as "remote" relative to a physical location of the second storage appliance.

In certain arrangements, the first storage appliance includes the first node and a second node. The method further includes setting, by the first storage appliance, the state of the first IO path between the host computer and the first node of the first storage appliance based on the first initial identification of the host computer as "local" relative to the physical location of the first storage appliance, and setting, by the first storage appliance, a state of a second IO path between the host computer and the second node of the first storage appliance based on the first initial identification of the host computer as "local" relative to the physical location of the first storage appliance.

In certain arrangements, the second storage appliance includes a first node and a second node. The method further includes setting, by the second storage appliance, a state of a first IO path between the host computer and the first node of the second storage appliance based on the second initial identification of the host computer as "remote" relative to the physical location of the second storage appliance, and setting, by the second storage appliance, a state of a second IO path between the host computer and the second node of the second storage appliance based on the second initial identification of the host computer as "remote" relative to the physical location of the second storage appliance.

In certain arrangements, the method further includes providing, by the first storage appliance, a first notification of (i) the state of the first IO path between the host computer and the first node of the first storage appliance and (ii) the state of the second IO path between the host computer and the second node of the first storage appliance, and providing, by the second storage appliance, a second notification of (ii) the state of the first IO path between the host computer and the first node of the second storage appliance and (ii) the state of the second IO path between the host computer and the second node of the second storage appliance, in which the selections of IO paths over which to access data of the storage object are made by the host computer in response to at least one of the first notification and the second notification.

In certain arrangements, the method further includes modifying the first initial identification of the host computer from "local" relative to the physical location of the first storage appliance to "remote" relative to the physical location of the first storage appliance.

In certain arrangements, the state of the first IO path between the host computer and the first node of the first storage appliance corresponds to an optimized state. The method further includes dynamically changing, by the first storage appliance, the state of the first IO path between the host computer and the first node of the first storage appliance from the optimized state to a non-optimized state.

In certain arrangements, the method further includes modifying the second initial identification of the host computer from "remote" relative to the physical location of the second storage appliance to "local" relative to the physical location of the second storage appliance based on the IO RT hints received at the second storage appliance.

In certain arrangements, the state of the first IO path between the host computer and the first node of the second storage appliance corresponds to a non-optimized state. The method further includes dynamically changing, by the second storage appliance, the state of the first IO path between the host computer and the first node of the second storage appliance from the non-optimized state to the optimized state.

In certain embodiments, a multi-site storage system includes at least one memory, and processing circuitry configured to execute program instructions out of the at least one memory to receive, at a first storage appliance, input/output (IO) response time (RT) hints from a host computer, in which the host computer is initially identified as "local" or "remote" relative to a physical location of the first storage appliance, and the IO RT hints received at the first storage appliance indicate a locational status or proximity of the host computer relative to the first storage appliance. The processing circuitry is further configured to execute the program instructions out of the memory to modify, by the first storage appliance, a first initial identification of the host computer as "local" or "remote" relative to the physical location of the first storage appliance based on the IO RT hints received at the first storage appliance, dynamically change, by the first storage appliance, a state of a first IO path between the host computer and a first node of the first storage appliance based on the modified first initial identification of the host computer, and provide, to the host computer by the first storage appliance, a notification of the changed state of the first IO path between the host computer and the first node of the first storage appliance, in which selections of IO paths over which to access data of a storage object within the multi-site storage system are made by the host computer in response to the notification of the changed state of the first IO path.

In certain arrangements, the processing circuitry is further configured to execute the program instructions out of the at least one memory to receive, at a second storage appliance, IO RT hints from the host computer, in which the IO RT hints received at the second storage appliance indicate a locational status or proximity of the host computer relative to the second storage appliance, and the host computer is not equidistant from the first storage appliance and the second storage appliance.

In certain arrangements, the host computer is initially situated at a location local to the first storage appliance and remote from the second storage appliance. The processing circuitry is further configured to execute the program instructions out of the at least one memory to make the first initial identification of the host computer as "local" relative to the physical location of the first storage appliance, and make a second initial identification of the host computer as "remote" relative to a physical location of the second storage appliance.

In certain arrangements, the first storage appliance includes the first node and a second node. The processing circuitry is further configured to execute the program instructions out of the at least one memory to set, by the first storage appliance, the state of a first IO path between the host computer and the first node of the first storage appliance based on the first initial identification of the host computer as "local" relative to the physical location of the first storage appliance, and set, by the first storage appliance, a state of a second IO path between the host computer and the second node of the first storage appliance based on the first initial identification of the host computer as "local" relative to the physical location of the first storage appliance.

In certain arrangements, the second storage appliance includes a first node and a second node. The processing circuitry is further configured to execute the program instructions out of the at least one memory to set, by the second storage appliance, a state of a first IO path between the host computer and the first node of the second storage appliance based on the second initial identification of the host computer as "remote" relative to the physical location of the second storage appliance, and set, by the second storage appliance, a state of a second IO path between the host computer and the second node of the second storage appliance based on the second initial identification of the host computer as "remote" relative to the physical location of the second storage appliance.

In certain arrangements, the processing circuitry is further configured to execute the program instructions out of the at least one memory to provide, by the first storage appliance, a first notification of (i) the state of the first IO path between the host computer and the first node of the first storage appliance and (ii) the state of the second IO path between the host computer and the second node of the first storage appliance, and provide, by the second storage appliance, a second notification of (i) the state of the first IO path between the host computer and the first node of the second storage appliance and (ii) the state of the second IO path between the host computer and the second node of the second storage appliance, in which the selections of IO paths over which to access data of the storage object are made by the host computer in response to at least one of the first notification and the second notification.

In certain arrangements, the state of the first IO path between the host computer and the first node of the first storage appliance corresponds to an optimized state. The processing circuitry is further configured to execute the program instructions out of the at least one memory to modify the first initial identification of the host computer from "local" relative to the physical location of the first storage appliance to "remote" relative to the physical location of the first storage appliance, and dynamically change, by the first storage appliance, the state of the first IO path between the host computer and the first node of the first storage appliance from the optimized state to a non-optimized state.

In certain arrangements, the state of the first IO path between the host computer and the first node of the second storage appliance corresponds to a non-optimized state. The processing circuitry is further configured to execute the program instructions out of the at least one memory to modify the second initial identification of the host computer from "remote" relative to the physical location of the second storage appliance to "local" relative to the physical location of the second storage appliance based on the IO RT hints received at the second storage appliance, and dynamically change, by the second storage appliance, the state of the first IO path between the host computer and the first node of the second storage appliance from the non-optimized state to the optimized state.

In certain embodiments, a computer program product includes a set of non-transitory, computer-readable media having instructions that, when executed by processing circuitry, cause the processing circuitry to perform a method including receiving, at a first storage appliance from among two storage appliances of a multi-site storage system, input/output (IO) response time (RT) hints from a host computer, in which the host computer is initially identified as "local" or "remote" relative to a physical location of the first storage appliance, and the IO RT hints received at the first storage appliance indicate a locational status or proximity of the host computer relative to the first storage appliance. The method further includes modifying, by the first storage appliance, a first initial identification of the host computer as "local" or "remote" relative to the physical location of the first storage appliance based on the IO RT hints received at the first storage appliance, dynamically changing, by the first storage appliance, a state of a first IO path between the host computer and a first node of the first storage appliance based on the modified first initial identification of the host computer, and providing a first notification to the host computer by the first storage appliance, in which the first notification indicates the changed state of the first IO path between the host computer and the first node of the first storage appliance, and selections of IO paths over which to access data of a storage object within the multi-site storage system are made by the host computer in response to the first notification.

In certain arrangements, the host computer is not equidistant from the first storage appliance and a second storage appliance from among the two storage appliances of the multi-site storage system. The method further includes receiving, at the second storage appliance, IO RT hints from the host computer, the host computer being initially identified as "remote" or "local" relative to a physical location of the second storage appliance, in which the IO RT hints received at the second storage appliance indicate a locational status or proximity of the host computer relative to the second storage appliance. The method further includes modifying, by the second storage appliance, a second initial identification of the host computer as "remote" or "local" relative to the physical location of the second storage appliance based on the IO RT hints received at the second storage appliance, dynamically changing, by the second storage appliance, a state of a first IO path between the host computer and a first node of the second storage appliance based on the modified second initial identification of the host computer, and providing a second notification to the host computer by the second storage appliance, in which the second notification indicates the changed state of the first IO path between the host computer and the first node of the second storage appliance, and the selections of IO paths over which to access data of the storage object within the multi-site storage system are made by the host computer in response to one or more of the first notification and the second notification.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for dynamically configuring a multi-site storage system such as a metro cluster using input/output (IO) response time (RT) hints from a host computer. The disclosed techniques can include receiving IO RT hints at each storage appliance of the multi-site storage system from the host computer, which is initially identified as "local" or "remote" relative to a physical location of the storage appliance. The disclosed techniques can further include modifying, by the storage appliance, an initial local or remote identification of the host computer relative to the physical location of the storage appliance based on the received IO RT hints, dynamically changing, by the storage appliance, states of IO paths between the host computer and nodes of the storage appliance based on the modified local or remote identification of the host computer, and providing, by the storage appliance, a notification of the changed states of the IO paths to the host computer. As a result, more appropriate host selections of IO paths over which to access data of a storage object within the multi-site storage system can be made with greater ease and efficiency.

Figure 1:
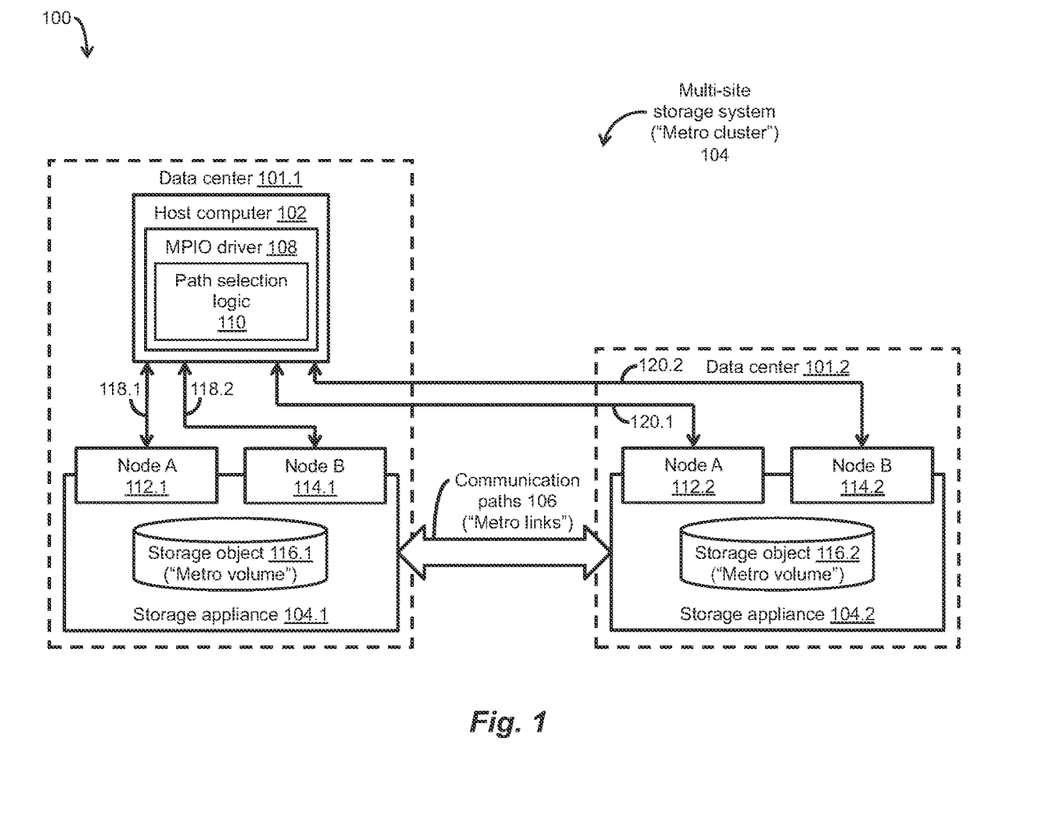
FIG. 1 is a block diagram of an exemplary storage environment, in which techniques can be practiced for dynamically configuring a multi-site storage system such as a metro cluster using input/output (IO) response time (RT) hints from a host computer.

FIG. 1 depicts an illustrative embodiment of an exemplary storage environment 100, in which techniques can be practiced for dynamically configuring a multi-site storage system 104 such as a metro cluster using IO response time (RT) hints from a host computer. As shown in FIG. 1, the metro cluster 104 can include a data center 101.1 and a data center 101.2. In one embodiment, the data centers 101.1, 101.2 can be physically located remotely from one another such as in different buildings or other locations where a distance between the data centers 101.1, 101.2 is on the order of a metropolitan distance (e.g., 60-100 kilometers (km)). The data centers 101.1, 101.2 can be interconnected by communication paths 106 (also referred to herein as "metro links"), which can be leased lines or part of a storage area network (SAN), a local area network (LAN), a metropolitan area network (MAN), a wide area network (WAN), the Internet, and/or any other suitable lines or networks.

As shown in FIG. 1, the data center 101.1 can include a client (or "host") computer 102 and a storage appliance 104.1, which can include a node A 112.1, a node B 114.1, and a storage object 116.1 hosted by a storage array (e.g., redundant array of independent disks (RAID)). Likewise, the data center 101.2 can include a storage appliance 104.2, which can include a node A 112.2, a node B 114.2, and a storage object 116.2 hosted by a storage array (e.g., RAID). Such storage arrays can include storage devices or drives such as solid-state drives (SSDs), hard disk drives (HDDs), optical drives, flash drives, hybrid drives, or any other suitable storage devices or drives. In the metro cluster 104 of FIG. 1, the nodes A 112.1, 114.1 of the storage appliance 104.1 can provision the storage object 116.1 as a logical unit (LUN) or volume (VOL). Likewise, the nodes A 112.2, 114.2 of the storage appliance 104.2 can provision the storage object 116.2 as a LUN or VOL. The metro links 106 can be configured to communicably couple the nodes 112.1, 112.2, 114.1, 114.2 of the respective storage appliances 104.1, 104.2 to one another.

As further shown in FIG. 1, the host computer 102 (e.g., client computer, server computer) can include a multipath IO (MPIO) driver 108 and path selection logic 110, which can provide path selection functionality for delivering storage IO operations and/or requests to the storage arrays of the storage appliances 104.1, 104.2. Such IO operations and/or requests can be delivered to the storage arrays via selected IO paths 118.1, 118.2, 120.1, 120.2 over a SAN, LAN, MAN, WAN, the Internet, and/or any other suitable network. Each of the IO paths 118.1, 118.2, 120.1, 120.2 can have one or more path attributes that the path selection logic 110 can query when performing the path selection functionality. For example, the IO path 118.1 may have a path attribute that defines it as a primary IO path for the storage object 116.1, and the IO path 118.2 may have a path attribute that defines it as a secondary IO path for the storage object 116.1. Similarly, the IO path 120.1 may have a path attribute that defines it as a primary IO path for the storage object 116.2, and the IO path 120.2 may have a path attribute that defines it as a secondary IO path for the storage object 116.2. In one embodiment, the MPIO driver 108 can be implemented using a PowerPath® driver, and the storage appliances 104.1, 104.2 can be implemented using PowerStore® appliances, each being suitably configured to perform the various techniques and/or methods disclosed herein. The PowerPath® driver and PowerStore® appliances are sold by Dell EMC, Hopkinton, Massachusetts, USA.

Figure 2:
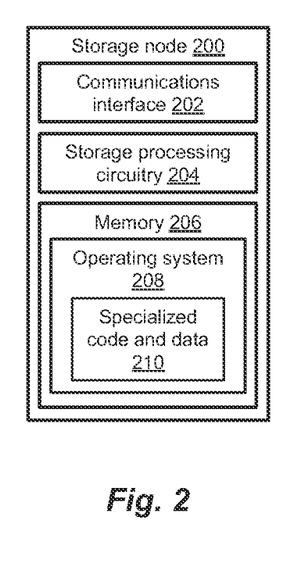
FIG. 2 is a block diagram of an exemplary storage node of a storage appliance included in the metro cluster of FIG. 1.

FIG. 2 depicts an exemplary implementation of a storage node 200. It is noted that each of the nodes A 112.1, B 114.1 of the storage appliance 104.1, as well as each of the nodes A 112.2, B 114.2 of the storage appliance 104.2, can be implemented like the storage node 200. As shown in FIG. 2, the storage node 200 can include a communications interface 202, storage processing circuitry 204, and a memory 206. The communications interface 202 can include an Ethernet interface, InfiniBand interface, Fiber Channel (FC) interface, IEEE 802.11x (WiFi) interface, Bluetooth interface, and/or any other suitable interface. The communications interface 202 can further include Small Computer System Interface (SCSI) target adapters, network interface adapters, and/or any other suitable adapters for converting electronic, optical, or wireless signals to a form suitable for use by the storage processing circuitry 204. The storage node 200 can further include or be associated with one or more IO devices (e.g., keyboard, trackpad, mouse), one or more displays, and/or any other suitable hardware or software components.

The memory 206 of the storage node 200 can include persistent memory (e.g., flash memory, magnetic memory) and/or non-persistent memory (e.g., dynamic random-access memory (DRAM), static random-access memory (SRAM)), as well as an operating system (OS) 208 such as a Linux OS, Unix OS, Windows OS, or any other suitable operating system. The memory 206 can store a variety of software constructs realized in the form of specialized code and data 210 (e.g., program instructions) executable by the storage processing circuitry 204 to carry out the techniques and/or methods disclosed herein.

The storage processing circuitry 204 of the storage node 200 can include one or more physical storage processors and/or engines configured to execute the specialized code and data 210, as well as data movers, director boards, blades, IO modules, drive controllers, switches, and/or any other suitable hardware components. The storage processing circuitry 204 can execute the specialized code and data 210 as program instructions out of the memory 206, process storage IO operations and/or requests issued by the host computer 102, and store data and/or metadata on storage devices or drives (e.g., SSDs, HDDs, optical drives, flash drives, hybrid drives) included in the storage arrays of the storage appliances 104.1, 104.2.

In the context of the storage processing circuitry 204 being implemented using one or more physical storage processors executing the specialized code and data 210, a computer program product can be configured to deliver all or a portion of the specialized code and data 210 to the physical storage processors. Such a computer program product can include one or more non-transient computer-readable storage media, such as a magnetic disk, magnetic tape, compact disk (CD), digital versatile disk (DVD), optical disk, flash drive, SSD, secure digital (SD) chip or device, application specific integrated circuit (ASIC), field programmable gate array (FPGA), and so on. The non-transient computer-readable storage media can be encoded with sets of program instructions for performing, when executed by the storage processors, the various techniques and/or methods disclosed herein.

In one embodiment, the nodes A 112.1, 114.1 of the storage appliance 104.1 can form a node pair (e.g., primary node, secondary node) configured to operate in a coordinated manner to provide processing resources for performing storage IO operations and servicing storage IO requests issued by the host computer 102. Likewise, the nodes A 112.2, 114.2 of the storage appliance 104.2 can form a node pair (e.g., primary node, secondary node) configured to operate in a coordinated manner to provide processing resources for performing storage IO operations and servicing storage IO requests issued by the host computer 102. To that end, the nodes A 112.1, 114.1 of the storage appliance 104.1 can be communicably coupled to one another via a Peripheral Component Interconnect express (PCIe) interconnection or any other suitable high speed interconnection. Likewise, the nodes A 112.2, 114.2 of the storage appliance 104.2 can be communicably coupled to one another via a PCIe interconnection or any other suitable high speed interconnection. The host computer 102 can communicate with the node pair A 112.1, 114.1 and the node pair A 112.2, 114.2 in accordance with one or more protocols such as the SCSI protocol, Internet SCSI (ISCSI) protocol, SCSI over FC (SCSI-FC) protocol, Non-Volatile Memory express (NVMe) over FC (NVMe/FC) protocol, NVMe over Fabric (NVMe-oF) protocol, NVMe over TCP (NVMe/TCP) protocol, and/or any other suitable protocol.

Further in this embodiment, each of the nodes A 112.1. B 114.1, A 112.2. B 114.2 can receive storage IO requests issued by the host computer 102 to a VOL or LUN For example, the storage IO requests (e.g., read IO requests, write IO requests) may be block-based or file-based. Upon receipt of a write IO request, the receiving node can process the write IO to a VOL maintained on its storage appliance (e.g., the storage appliance 104.1) and mirror the write IO to a VOL maintained on another storage appliance (e.g., the storage appliance 104.2) of the metro cluster 104. Once the mirrored write IO is acknowledged at the storage appliance 104.2, the storage appliance 104.1 can send a reply to the write IO request to the host computer 102. In this way, consistency can be assured between the two VOLs maintained on the two storage appliances, respectively.

With reference to FIG. 1, if the node A 112.1 or B 114.1 of the storage appliance 104.1 receives the write IO request, then the node A 112.1 or B 114.1 can process the write IO to the storage object 116.1 on the storage appliance 104.1 and mirror the write IO over the metro links 106 to the storage object 116.2 on the storage appliance 104.2 using the node A 112.2 or B 114.2. Likewise, if the node A 112.2 or B 114.2 receives the write IO request, the node A 112.2 or B 114.2 can process the write IO to the storage object 116.2 on the storage appliance 104.2 and mirror the write IO over the metro links 106 to the storage object 116.1 on the storage appliance 104.1 using the node A 112.1 or B 114.1. Within the metro cluster 104, the storage objects 116.1, 116.2 (e.g., VOLs, LUNs) maintained on the storage appliances 104.1, 104.2, respectively, can be perceived by the host computer 102 as a single storage object, which is referred to herein as a "metro volume." In one embodiment, the storage objects 116.1, 116.2 can be maintained on separate SCSI HDDs, each of which can have the same SCSI identifier (SCSI ID). As such, the metro volume can be effectively exposed across the two storage appliances 104.1, 104.2. It is noted that that other storage objects (e.g., VOLs, LUNs) not in metro configurations can be maintained on the SCSI HDDs along with the metro volume.

In prior embodiments, a system administrator or other user designates or identifies a host computer as "local" to a storage appliance (the "local storage appliance") physically located at a first data center and "remote" to another storage appliance (the "remote storage appliance") physically located at a second (i.e., different) data center. Based on the local and remote identifications of the host computer, the system administrator defines or sets, via a user interface (e.g., GUI, REpresentational State Transfer (REST) interface), states (e.g., ALUA optimized/non-optimized) of IO paths between the host computer and nodes of the local and remote storage appliances. In certain instances, however, the host computer and/or one of the storage appliances may be moved from their current physical locations to different physical locations such as different data centers, causing initial local and remote identifications of the host computer to become invalid. Further, in a production storage environment, increased IO RTs for the IO paths between the host computer and the nodes of the local storage appliance due to SAN congestion, faulty SAN connectivity, and so on, may introduce additional network latency overhead to storage IO processing at the local storage appliance. If the additional network latency overhead at the local storage appliance exceeds a network latency overhead to the remote storage appliance, then it may be more appropriate for the host computer to select an IO path for a node of the remote storage appliance rather than the local storage appliance to access data of a metro volume. It may also be more appropriate for the host computer to select an IO path for a node of the remote storage appliance during a nondisruptive upgrade (NDU) of the local storage appliance, which at that time may have just one working node. However, because, in prior embodiments, the local and remote identifications of the host computer will remain static and unchanging until modified by the storage administrator, such more appropriate host selections of IO paths to nodes of storage appliances over which to access data of a metro volume may be more difficult and/or less efficient to make.

To address such difficulties and/or inefficiencies of the prior embodiments, techniques are disclosed herein for dynamically configuring a multi-site storage system such as a metro cluster using IO response time (RT) hints from a host computer. The disclosed techniques can allow appropriate host selections of IO paths to nodes of two (or more) storage appliances of the metro cluster to be made with greater ease and efficiency. The disclosed techniques can include receiving IO RT hints at each storage appliance of the multi-site storage system from the host computer, which is initially identified as "local" or "remote" relative to a physical location of the storage appliance. The disclosed techniques can further include modifying, by the storage appliance, an initial local or remote identification of the host computer relative to the physical location of the storage appliance based on the received IO RT hints, dynamically changing, by the storage appliance, states of IO paths between the host computer and nodes of the storage appliance based on the modified local or remote identification of the host computer, and providing, by the storage appliance, a notification of the changed states of the IO paths to the host computer. As a result, more appropriate host selections of IO paths over which to access data of a storage object within the multi-site storage system can be made with greater ease and efficiency.

The disclosed techniques for dynamically configuring a multi-site storage system such as a metro cluster using IO RT hints from a host computer will be further understood with reference to the following illustrative example and FIG. 1. In this example, it is assumed that a metro volume within the metro cluster 104 (see FIG. 1) is configured or provisioned to the host computer 102, which is physically located in the data center 101.1. It is further assumed that the storage appliance 104.1 is physically located in the data center 101.1, and the storage appliance 104.2 is physically located in the data center 101.2, which is situated at a metropolitan distance (e.g., 60-100 km) from the data center 101.1.

In this example, each of the storage appliances 104.1, 104.2 receives, from the host computer 102, IO RTs measured or obtained for IO paths between the host computer 102 and nodes of the respective storage appliances 104.1, 104.2. The storage appliance 104.1 receives IO RTs for the IO paths 118.1, 118.2 between the host computer 102 and the nodes A 112.1, 114.1, respectively, and the storage appliance 104.2 receives IO RTs for the IO paths 120.1, 120.2 between the host computer 102 and the nodes A 112.2, 114.2, respectively. For example, in response to receiving replies to storage IO operations or requests from the storage array of the storage appliance 104.1 over the IO paths 118.1, 118.2, the host computer 102 may return messages to the storage appliance 104.1 containing timestamps indicative of IO RTs for the respective IO paths 118.1, 118.2. Similarly, in response to receiving replies to storage IO operations or requests from the storage array of the storage appliance 104.2 over the IO paths 120.1, 120.2, the host computer 102 may return messages to the storage appliance 104.2 containing timestamps indicative of IO RTs for the respective IO paths 120.1, 120.2. Such IO RTs can be characterized as hints (or "IO RT hints") regarding a locational status or proximity of the host computer 102 relative to the storage appliances 104.1, 104.2. For example, a specialized command such as an SCSI vendor unique (VU) command may be used by the host computer 102 to send or provide the IO RT hints to the respective storage appliances 104.1, 104.2.

In response to receiving the IO RT hints for the IO paths 118.1, 118.2, 120.1, 120.2, the storage appliances 104.1, 104.2 perform initial identifications of the host computer 102 as "local" or "remote" relative to physical locations of the storage appliances 104.1, 104.2. In this example, in response to receiving IO RT hints for the IO paths 118.1, 118.2, the storage appliance 104.1 performs an initial identification of the host computer 102 as "local" relative to its physical location within the data center 101.1. Further, in response to receiving IO RT hints for the IO paths 120.1, 120.2, the storage appliance 104.2 performs an initial identification of the host computer 102 as "remote" relative to its physical location within the data center 101.2.

Having performed the initial identifications of the host computer 102 as "local" or "remote" relative to their physical locations, the storage appliances 104.1, 104.2 define or set states of the IO paths 118.1, 118.2, 120.1, 120.2 based on the initial host identifications. Each IO path 118.1, 118.2 can be associated with one or more ports (e.g., iSCSI target port groups) of the storage appliance 104.1, which can set the states of the IO paths 118.1, 118.2 by setting states of their associated target port groups. Likewise, each IO path 120.1, 120.2 can be associated with one or more ports (e.g., iSCSI target port groups) of the storage appliance 104.2, which can set the states of the IO paths 120.1, 120.2 by setting states of their associated target port groups. Each of the target port groups associated with the IO paths 118.1, 118.2 can have specific access characteristics to the storage object 116 (e.g., VOL). Similarly, each of the target port groups associated with the IO paths 120.1, 120.2 can have specific access characteristics to the storage object 116.2 (e.g., VOL). For example, such access characteristics associated with the IO path ports may define the states of the IO paths 118.1, 118.2, 120.1, 120.2 as ALUA optimized or ALUA non-optimized.

In this example, based on the initial identification of the host computer 102 as "local" relative to its physical location within the data center 101.1, the storage appliance 104.1 sets the state of the IO path 118.1 between the host computer 102 and the node A 112.1 as ALUA optimized, and sets the state of the IO path 118.2 between the host computer 102 and the node B 114.1 as ALUA non-optimized. Further, based on the initial identification of the host computer 102 as "remote" relative to its physical location within the data center 101.2, the storage appliance 104.2 sets the state of the IO path 120.1 between the host computer 102 and the node A 112.2 as ALUA non-optimized, and sets the state of the IO path 120.2 between the host computer 102 and the node B 114.2 as ALUA non-optimized.

Once the states of the IO paths 118.1, 118.2, 120.1, 120.2 have been set based on the initial host identifications, the storage appliances 104.1, 104.2 send or provide notifications of the IO path states to the host computer 102. In this example, the storage appliance 104.1 provides, to the host computer 102, a notification of the ALUA optimized state of the IO path 118.1 and the ALUA non-optimized state of the IO path 118.2. Further, the storage appliance 104.2 provides, to the host computer 102, a notification of the ALUA non-optimized state of the IO path 120.1 and the ALUA non-optimized state of the IO path 120.2. In one embodiment, the host computer 102, using ALUA technology, can query the storage appliances 104.1, 104.2 to obtain the states of the IO paths for the respective nodes.

Upon receipt of the notifications of the IO path states, the MPIO driver 108 on the host computer 102 executes the path selection logic 110 to select an appropriate IO path 118.1, 118.2, 120.1, or 120.2 over which to access data of the metro volume based on the states of the respective IO paths. For example, the MPIO driver 108 may select the IO path 118.1 whose state is ALUA optimized to access the data of the metro volume via the node A 112.1 of the storage appliance 104.1. It is noted that although the IO path 118.1 whose state is ALUA optimized is the primary (or preferred) IO path to use for accessing data of the metro volume, the IO paths 118.2, 120.1, 120.2 whose states are ALUA non-optimized can also be used to access the metro volume data in an Advanced Technology Attachment (ATA) scenario, in which a queued feature set can allow the host computer 102 to issue concurrent or queued storage IO commands over the IO paths 118.1, 118.2, 120.1, 120.2 to the metro volume.

In this example, each of the storage appliances 104.1, 104.2 within the metro cluster 104 can receive, from the host computer 102 at periodic hourly intervals, additional IO RT hints for the IO paths between the host computer 102 and the nodes of the respective storage appliances 104.1, 104.2. In response to receiving additional IO RT hints at a predetermined number of periodic hourly intervals, the storage appliances 104.1, 104.2 perform subsequent identifications of the host computer 102 as "local" or "remote" relative to physical locations of the storage appliances 104.1, 104.2. For example, the host computer 102 may be moved from its current physical location within the data center 101.1 to a different physical location within the data center 101.2, causing the initial local and remote identifications of the host computer 102 to become invalid. By performing the subsequent identifications of the host computer 102 after receiving additional IO RT hints at the predetermined number of periodic hourly intervals, possible rare surges, infrequent loads, thrashing, and so on, can be avoided while providing some hysteresis in the host identifications. In response to receiving the additional IO RT hints for the IO paths 118.1, 118.2 at the certain periodic interval, the storage appliance 104.1 performs a subsequent identification of the host computer 102 as "remote" relative to its physical location within the data center 101.1. Further, in response to receiving the additional IO RT hints for the IO paths 120.1, 120.2 at the certain periodic interval, the storage appliance 104.2 performs a subsequent identification of the host computer 102 as "local" relative to its physical location within the data center 101.2.

Having performed the subsequent identifications of the host computer 102 as "local" or "remote" relative to their respective physical locations, the storage appliances 104.1, 104.2 dynamically redefine, reset, or change the states of the IO paths 118.1, 118.2, 120.1, 120.2 based on the subsequent host identifications. In this example, based on the subsequent identification of the host computer 102 as "remote" relative to its physical location within the data center 101.1, the storage appliance 104.1 dynamically changes the state of the IO path 118.1 between the host computer 102 and the node A 112.1 from ALUA optimized to ALUA non-optimized. Further, based on the subsequent identification of the host computer 102 as "local" relative to its physical location within the data center 101.2, the storage appliance 104.2 dynamically changes the state of the IO path 120.1 between the host computer 102 and the node A 112.2 from ALUA non-optimized to ALUA optimized.

Once the states of the IO paths 118.1, 120.1 have been dynamically changed based on the subsequent host identifications, the storage appliances 104.1, 104.2 send or provide notifications of the IO path state changes to the host computer 102 using, for example, ALUA State Change Unit Attention. In this example, the storage appliance 104.1 provides, to the host computer 102, a notification of the ALUA non-optimized state of the IO path 118.1, and the storage appliance 104.2 provides, to the host computer 102, a notification of the ALUA optimized state of the IO path 120.1. Upon receipt of the notifications of the IO path state changes, the MPIO driver 108 on the host computer 102 executes the path selection logic 110 to select a more appropriate IO path 118.1, 118.2, 120.1, or 120.2 over which to access data of the metro volume based on the states of the respective IO paths. For example, the MPIO driver 108 may select the IO path 120.1 whose state was changed from ALUA non-optimized to ALUA optimized to access the data of the metro volume via the node A 112.2 of the storage appliance 104.2.

Figure 3:
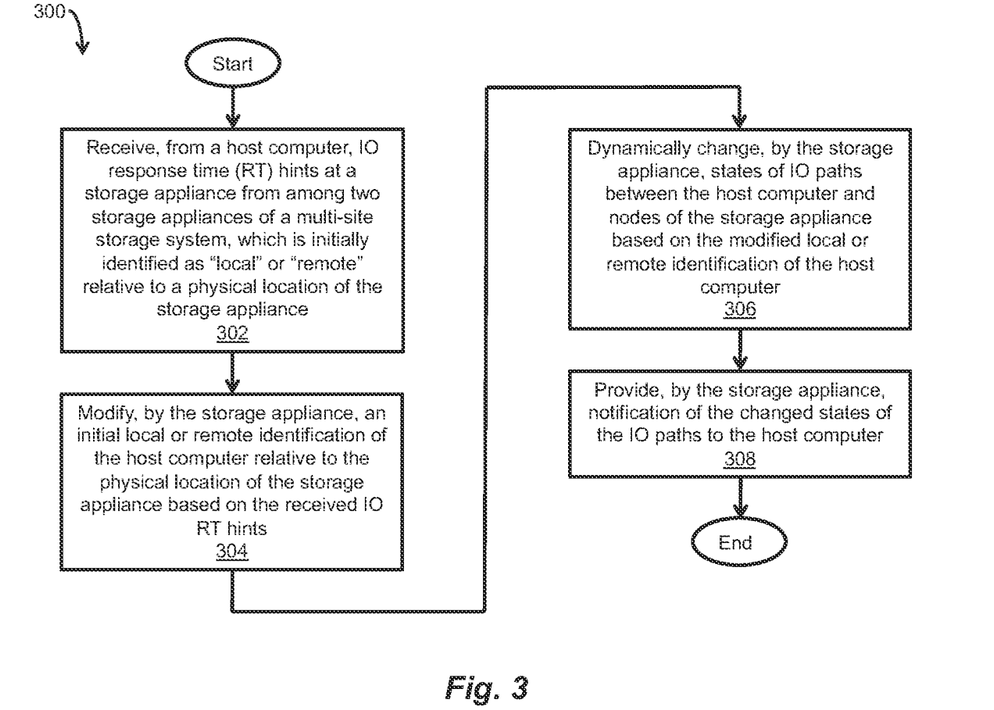
FIG. 3 is a flow diagram of an exemplary method of dynamically configuring a multi-site storage system such as a metro cluster using IO RT hints from a host computer.

A method of dynamically configuring a multi-site storage system using IO response time hints from a host computer is described below with reference to FIG. 3. As depicted in block 302, IO response time (RT) hints are received, from the host computer, at a storage appliance from among two storage appliances of the multi-site storage system, which is initially identified as "local" or "remote" relative to a physical location of the storage appliance. As depicted in block 304, an initial local or remote identification of the host computer relative to the physical location of the storage appliance is modified, by the storage appliance, based on the received IO RT hints. As depicted in block 306, states of IO paths between the host computer and nodes of the storage appliance are dynamically changed, by the storage appliance, based on the modified local or remote identification of the host computer. As depicted in block 308, a notification of the changed states of the IO paths is provided by the storage appliance to the host computer. As a result, more appropriate host selections of IO paths over which to access data of a storage object within the multi-site storage system can be made with greater ease and efficiency.

Having described the above illustrative embodiments, various alternative embodiments and/or variations may be made and/or practiced. For example, it was described herein that the data center 101.1 can include the storage appliance 104.1, the data center 101.2 can include the storage appliance 104.2, and the metro links 106 can communicably couple the nodes of the respective storage appliances 104.1, 104.2 to one another. In an alternative embodiment, the data center 101.1 can include a plurality of storage appliances in the same cluster, and the data center 101.2 can include a plurality of storage appliances in the same cluster, in which the cluster of storage appliances at the data center 101.1 is in a metro relationship with the cluster of storage appliances at the data center 101.2.

It was further described herein that the data center 101.1 can include the host computer 102. In an alternative embodiment, the data center 101.1 can include a first host computer, and the data center 101.2 can include a second host computer, in which the first and second host computers are clustered across the metro links 106. As such, a virtual machine (VM) running on the first host computer and configured to access data of the metro volume from the data center 101.1 location can be moved or migrated to the second host computer to access the data of the metro volume from the data center 101.2 location. Once the VM has been moved or migrated from the first host computer to the second host computer, states of IO paths can be dynamically changed and IO path state notifications can be made, as appropriate, as previously described herein.

It was further described herein that, in response to receiving replies to storage IO operations or requests from the storage appliances 104.1, 104.2, the host computer 102 can return messages indicative of IO RTs ("IO RT hints") for the IO paths 118.1, 118.2, 120.1, 120.2. In response to receiving such IO RT hints for the IO paths 118.1, 118.2, 120.1, 120.2 at certain periodic intervals, the storage appliances 104.1, 104.2 can perform subsequent identifications of the host computer 102 as "local" or "remote" relative to their physical locations, and dynamically redefine, reset, or change the states of the IO paths 118.1, 118.2, 120.1, 120.2 based on the subsequent host identifications. In an alternative embodiment, the storage appliances 104.1, 104.2 can perform such subsequent identifications of the host computer 102 as "local" or "remote" in response to receiving a plurality of IO RT samples, and dynamically change the states of the IO paths 118.1, 118.2, 120.1, 120.2 once a certain network latency threshold is observed or exceeded based on the plurality of IO RT samples.

It was further described herein that the host computer 102 can communicate with the storage appliances 104.1, 104.2 in accordance with a SCSI protocol (e.g., iSCSI, SCSI-FC), and the states of the IO paths 118.1, 118.2, 120.1, 120.2 can be defined as ALUA optimized or ALUA non-optimized. In an alternative embodiment, the host computer 102 can communicate with the storage appliances 104.1, 104.2 in accordance with an NVMe protocol (e.g., NVMe/FC, NVMe-oF, NVMe/TCP), and the states of the IO paths 118.1, 118.2, 120.1, 120.2 can be defined as NVMe optimized or NVMe non-optimized. As such, Asymmetric Namespace Access (ANA) optimization priorities can be assigned to indicate which IO path is the primary (or preferred) IO path that the host computer 102 should use. Further, the host computer 102 can use an NVMe Identify command to send or provide IO RT hints to the storage appliances 104.1, 104.2, which can send or provide a notification of IO path states or IO path state changes to the host computer 102 using an Asynchronous Event Notification (AEN).

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives. As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
    receiving, at a first storage appliance from among two storage appliances of a multi-site storage system, input/output (IO) response time (RT) hints from a host computer, the host computer being initially identified as "local" or "remote" relative to a physical location of the first storage appliance, the IO RT hints received at the first storage appliance indicating a locational status or proximity of the host computer relative to the first storage appliance;
    modifying, by the first storage appliance, a first initial identification of the host computer as "local" or "remote" relative to the physical location of the first storage appliance based on the IO RT hints received at the first storage appliance;
    dynamically changing, by the first storage appliance, a state of a first IO path between the host computer and a first node of the first storage appliance based on the modified first initial identification of the host computer; and
    providing, to the host computer by the first storage appliance, a notification of the changed state of the first IO path between the host computer and the first node of the first storage appliance, wherein selections of IO paths over which to access data of a storage object within the multi-site storage system are made by the host computer in response to the notification of the changed state of the first IO path.

2. The method of claim 1 further comprising:
    receiving, at a second storage appliance from among the two storage appliances of the multi-site storage system, IO RT hints from the host computer, the IO RT hints received at the second storage appliance indicating a locational status or proximity of the host computer relative to the second storage appliance, wherein the host computer is not equidistant from the first storage appliance and the second storage appliance.

3. The method of claim 2 wherein the host computer is initially situated at a location local to the first storage appliance and remote from the second storage appliance, and wherein the method further comprises:
    making the first initial identification of the host computer as "local" relative to the physical location of the first storage appliance; and
    making a second initial identification of the host computer as "remote" relative to a physical location of the second storage appliance.

4. The method of claim 3 wherein the first storage appliance includes the first node and a second node, and wherein the method further comprises:
    setting, by the first storage appliance, the state of the first IO path between the host computer and the first node of the first storage appliance based on the first initial identification of the host computer as "local" relative to the physical location of the first storage appliance; and
    setting, by the first storage appliance, a state of a second IO path between the host computer and the second node of the first storage appliance based on the first initial identification of the host computer as "local" relative to the physical location of the first storage appliance.

5. The method of claim 4 wherein the second storage appliance includes a first node and a second node, and wherein the method further comprises:
    setting, by the second storage appliance, a state of a first IO path between the host computer and the first node of the second storage appliance based on the second initial identification of the host computer as "remote" relative to the physical location of the second storage appliance; and
    setting, by the second storage appliance, a state of a second IO path between the host computer and the second node of the second storage appliance based on the second initial identification of the host computer as "remote" relative to the physical location of the second storage appliance.

6. The method of claim 5 further comprising:
    providing, by the first storage appliance, a first notification of (i) the state of the first IO path between the host computer and the first node of the first storage appliance and (ii) the state of the second IO path between the host computer and the second node of the first storage appliance; and
    providing, by the second storage appliance, a second notification of (ii) the state of the first IO path between the host computer and the first node of the second storage appliance and (ii) the state of the second IO path between the host computer and the second node of the second storage appliance, wherein the selections of IO paths over which to access data of the storage object are made by the host computer in response to at least one of the first notification and the second notification.

7. The method of claim 5 wherein modifying the first initial identification of the host computer includes modifying the first initial identification of the host computer from "local" relative to the physical location of the first storage appliance to "remote" relative to the physical location of the first storage appliance.

8. The method of claim 7 wherein the state of the first IO path between the host computer and the first node of the first storage appliance corresponds to an optimized state, and wherein dynamically changing the state of the first IO path between the host computer and the first node of the first storage appliance based on the modified first initial identification of the host computer includes dynamically changing, by the first storage appliance, the state of the first IO path between the host computer and the first node of the first storage appliance from the optimized state to a non-optimized state.

9. The method of claim 8 further comprising:
modifying the second initial identification of the host computer from "remote" relative to the physical location of the second storage appliance to "local" relative to the physical location of the second storage appliance based on the IO RT hints received at the second storage appliance.

10. The method of claim 9 wherein the state of the first IO path between the host computer and the first node of the second storage appliance corresponds to a non-optimized state, and wherein the method further comprises:
dynamically changing, by the second storage appliance, the state of the first IO path between the host computer and the first node of the second storage appliance from the non-optimized state to the optimized state.

11. A multi-site storage system comprising:
at least one memory; and
processing circuitry configured to execute program instructions out of the at least one memory to:
receive, at a first storage appliance, input/output (IO) response time (RT) hints from a host computer, the host computer being initially identified as "local" or "remote" relative to a physical location of the first storage appliance, the IO RT hints received at the first storage appliance indicating a locational status or proximity of the host computer relative to the first storage appliance;
modify, by the first storage appliance, a first initial identification of the host computer as "local" or "remote" relative to the physical location of the first storage appliance based on the IO RT hints received at the first storage appliance;
dynamically change, by the first storage appliance, a state of a first IO path between the host computer and a first node of the first storage appliance based on the modified first initial identification of the host computer; and
provide, to the host computer by the first storage appliance, a notification of the changed state of the first IO path between the host computer and the first node of the first storage appliance, wherein selections of IO paths over which to access data of a storage object within the multi-site storage system are made by the host computer in response to the notification of the changed state of the first IO path.

12. The multi-site storage system of claim 11 wherein the processing circuitry is further configured to execute the program instructions out of the at least one memory to:
receive, at a second storage appliance, IO RT hints from the host computer, the IO RT hints received at the second storage appliance indicating a locational status or proximity of the host computer relative to the second storage appliance, wherein the host computer is not equidistant from the first storage appliance and the second storage appliance.

13. The multi-site storage system of claim 12 wherein the host computer is initially situated at a location local to the first storage appliance and remote from the second storage appliance, and wherein the processing circuitry is further configured to execute the program instructions out of the at least one memory to:
make the first initial identification of the host computer as "local" relative to the physical location of the first storage appliance; and
make a second initial identification of the host computer as "remote" relative to a physical location of the second storage appliance.

14. The multi-site storage system of claim 13 wherein the first storage appliance includes the first node and a second node, and wherein the processing circuitry is further configured to execute the program instructions out of the at least one memory to:
set, by the first storage appliance, the state of a first IO path between the host computer and the first node of the first storage appliance based on the first initial identification of the host computer as "local" relative to the physical location of the first storage appliance; and
set, by the first storage appliance, a state of a second IO path between the host computer and the second node of the first storage appliance based on the first initial identification of the host computer as "local" relative to the physical location of the first storage appliance.

15. The multi-site storage system of claim 14 wherein the second storage appliance includes a first node and a second node, and wherein the processing circuitry is further configured to execute the program instructions out of the at least one memory to:
set, by the second storage appliance, a state of a first IO path between the host computer and the first node of the second storage appliance based on the second initial identification of the host computer as "remote" relative to the physical location of the second storage appliance; and
set, by the second storage appliance, a state of a second IO path between the host computer and the second node of the second storage appliance based on the second initial identification of the host computer as "remote" relative to the physical location of the second storage appliance.

16. The multi-site storage system of claim 15 wherein the processing circuitry is further configured to execute the program instructions out of the at least one memory to:
provide, by the first storage appliance, a first notification of (i) the state of the first IO path between the host computer and the first node of the first storage appliance and (ii) the state of the second IO path between the host computer and the second node of the first storage appliance; and
provide, by the second storage appliance, a second notification of (i) the state of the first IO path between the host computer and the first node of the second storage appliance and (ii) the state of the second IO path between the host computer and the second node of the second storage appliance, wherein the selections of IO paths over which to access data of the storage object are made by the host computer in response to at least one of the first notification and the second notification.

17. The multi-site storage system of claim 15 wherein the state of the first IO path between the host computer and the first node of the first storage appliance corresponds to an optimized state, and wherein the processing circuitry is further configured to execute the program instructions out of the at least one memory to:
modify the first initial identification of the host computer from "local" relative to the physical location of the first storage appliance to "remote" relative to the physical location of the first storage appliance; and
dynamically change, by the first storage appliance, the state of the first IO path between the host computer and the first node of the first storage appliance from the optimized state to a non-optimized state.

18. The multi-site storage system of claim 17 wherein the state of the first IO path between the host computer and the first node of the second storage appliance corresponds to a non-optimized state, and wherein the processing circuitry is further configured to execute the program instructions out of the at least one memory to:

modify the second initial identification of the host computer from "remote" relative to the physical location of the second storage appliance to "local" relative to the physical location of the second storage appliance based on the IO RT hints received at the second storage appliance; and dynamically change, by the second storage appliance, the state of the first IO path between the host computer and the first node of the second storage appliance from the non-optimized state to the optimized state.

19. A computer program product including a set of non-transitory, computer-readable media having instructions that, when executed by processing circuitry, cause the processing circuitry to perform a method comprising:

receiving, at a first storage appliance from among two storage appliances of a multi-site storage system, input/output (IO) response time (RT) hints from a host computer, the host computer being initially identified as "local" or "remote" relative to a physical location of the first storage appliance, the IO RT hints received at the first storage appliance indicating a locational status or proximity of the host computer relative to the first storage appliance;

modifying, by the first storage appliance, a first initial identification of the host computer as "local" or "remote" relative to the physical location of the first storage appliance based on the IO RT hints received at the first storage appliance;

dynamically changing, by the first storage appliance, a state of a first IO path between the host computer and a first node of the first storage appliance based on the modified first initial identification of the host computer; and providing a first notification to the host computer by the first storage appliance, the first notification indicating the changed state of the first IO path between the host computer and the first node of the first storage appliance, wherein selections of IO paths over which to access data of a storage object within the multi-site storage system are made by the host computer in response to the first notification.

20. The computer program product of claim 19 wherein the host computer is not equidistant from the first storage appliance and a second storage appliance from among the two storage appliances of the multi-site storage system, and wherein the method further comprises:

receiving, at the second storage appliance, IO RT hints from the host computer, the host computer being initially identified as "remote" or "local" relative to a physical location of the second storage appliance, the IO RT hints received at the second storage appliance indicating a locational status or proximity of the host computer relative to the second storage appliance;

modifying, by the second storage appliance, a second initial identification of the host computer as "remote" or "local" relative to the physical location of the second storage appliance based on the IO RT hints received at the second storage appliance;

dynamically changing, by the second storage appliance, a state of a first IO path between the host computer and a first node of the second storage appliance based on the modified second initial identification of the host computer; and providing a second notification to the host computer by the second storage appliance, the second notification indicating the changed state of the first IO path between the host computer and the first node of the second storage appliance, wherein the selections of IO paths over which to access data of the storage object within the multi-site storage system are made by the host computer in response to one or more of the first notification and the second notification.

\* \* \* \* \*